US011718749B2

(12) United States Patent
Huang et al.

(10) Patent No.: US 11,718,749 B2
(45) Date of Patent: Aug. 8, 2023

(54) POLYCARBONATE COMPOSITION

(71) Applicant: Covestro Deutschland AG, Leverkusen (DE)

(72) Inventors: Zhenyu Huang, Shanghai (CN); Hao Han, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/650,562

(22) PCT Filed: Aug. 31, 2018

(86) PCT No.: PCT/CN2018/103578
§ 371 (c)(1),
(2) Date: Mar. 25, 2020

(87) PCT Pub. No.: WO2019/062472
PCT Pub. Date: Apr. 4, 2019

(65) Prior Publication Data
US 2021/0198481 A1 Jul. 1, 2021

(30) Foreign Application Priority Data

Sep. 28, 2017 (CN) .......................... 201710903032.6

(51) Int. Cl.
C08L 69/00 (2006.01)
C08K 5/5399 (2006.01)
C08L 83/10 (2006.01)
C08G 64/18 (2006.01)

(52) U.S. Cl.
CPC ............ *C08L 69/00* (2013.01); *C08G 64/186* (2013.01); *C08K 5/5399* (2013.01); *C08L 83/10* (2013.01); *C08L 2205/02* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 3,419,634 A | 12/1968 | Vaughn, Jr. | |
| 3,553,167 A | 1/1971 | Schnell et al. | |
| 3,654,575 A | 4/1972 | Cluwen | |
| 3,671,487 A | 6/1972 | Abolins | |
| 3,723,373 A | 3/1973 | Lucas | |
| 3,838,092 A | 9/1974 | Vogt et al. | |
| 4,075,173 A | 2/1978 | Maruyama et al. | |
| 4,156,069 A | 5/1979 | Prevorsek et al. | |
| 4,311,823 A | 1/1982 | Imai et al. | |
| 4,334,053 A | 6/1982 | Freitag et al. | |
| 4,584,360 A | 4/1986 | Paul et al. | |
| 4,982,014 A | 1/1991 | Freitag et al. | |
| 6,093,759 A | 7/2000 | Gareiss et al. | |
| 8,841,367 B2 | 9/2014 | Zheng et al. | |
| 8,895,649 B2 | 11/2014 | Li et al. | |
| 8,927,661 B2 | 1/2015 | Li et al. | |
| 2006/0199879 A1* | 9/2006 | Agarwal | C08L 69/00 524/451 |
| 2009/0088514 A1 | 4/2009 | Shiping | |
| 2013/0317146 A1* | 11/2013 | Li | C08L 69/005 524/121 |
| 2014/0107264 A1 | 4/2014 | van der Weele et al. | |
| 2014/0113983 A1* | 4/2014 | Czaplicki | C08G 59/4021 521/92 |
| 2014/0371360 A1 | 12/2014 | Zheng et al. | |
| 2016/0194495 A1 | 7/2016 | Li et al. | |
| 2017/0037245 A1 | 2/2017 | van de Wetering | |
| 2017/0247539 A1 | 8/2017 | Chen et al. | |

FOREIGN PATENT DOCUMENTS

| | | |
|---|---|---|
| CA | 1173998 A | 9/1984 |
| CN | 104334638 A | 2/2015 |
| CN | 106661317 A | 5/2017 |
| DE | 1961668 A1 | 6/1970 |

(Continued)

OTHER PUBLICATIONS

International Search Report for PCT/CN2018/103578 dated Dec. 5, 2018.
Written Opinion of the International Searching Authority for PCT/CN2018/103578 dated Dec. 5, 2018.

*Primary Examiner* — David J Buttner
(74) *Attorney, Agent, or Firm* — The Webb Law Firm

(57) ABSTRACT

The present invention relates to a polycarbonate composition and the process for the production thereof and molded articles. The polycarbonate composition provided in the present invention comprises A) 8-70 wt. % of a polycarbonate component, B) 25-90 wt. % of a polysiloxane-polycarbonate copolymer component, C) a flame retardant component, which comprises 0.5-6 wt. % of a cyclic phosphazene of formula (X) and D) an impact modifier component, which comprises 0.5-6 wt. % of methyl methacrylate-butadiene-styrene, with the above weight percentages based on said polycarbonate composition as 100 wt. %. The polycarbonate composition provided in the present invention has a high flame-retardant level, an excellent low-temperature impact-resistant property and good heat resistance, and is suitable for the use requirement of casings for electrical devices which have relatively high flame-retardant levels (such as UL94 5VB) and require an excellent low-temperature impact-resistant property.

17 Claims, No Drawings

(56) References Cited

FOREIGN PATENT DOCUMENTS

| | | |
|---|---|---|
| DE | 1495626 B1 | 6/1971 |
| DE | 2232877 A1 | 1/1974 |
| DE | 2703376 A1 | 8/1977 |
| DE | 2714544 A1 | 10/1977 |
| DE | 3000610 A1 | 7/1980 |
| DE | 2940024 A1 | 4/1981 |
| DE | 3007934 A1 | 9/1981 |
| DE | 3334782 A1 | 10/1984 |
| DE | 3832396 A1 | 2/1990 |
| EP | 728811 A2 | 8/1996 |
| WO | WO-9740092 A1 | 10/1997 |
| WO | WO-2015022676 A1 | 2/2015 |
| WO | WO-2016157098 A1 | 10/2016 |
| WO | WO-2016174592 A1 | 11/2016 |

\* cited by examiner

POLYCARBONATE COMPOSITION

CROSS-REFERENCE TO RELATED APPLICATIONS

This application is a national stage application (under 35 U.S.C. § 371) of PCT/CN2018/103578, filed Aug. 31, 2018, which claims benefit of Chinese Application No. 201710903032.6, filed Sep. 28, 2017, both of which are incorporated herein by reference in their entirety.

TECHNICAL FIELD

The present invention belongs to the polycarbonate field, specifically relates to a polycarbonate composition having improved impact-resistant property, the process for the production thereof and the use thereof.

BACKGROUND ART

Generally, casings for electrical devices should provide barrier protection from the external, and also reach suitable heat resistance and flame retardance requirements, because electrical devices produce relatively much heat itself during work or work in environments with relatively high temperatures. Polycarbonate material has good toughness under room temperature, as well as high heat resistance and good flame retardance. Thus, it can be used for the preparation of casings for many electrical devices, such as casings for power adaptors, chargers, etc. The polycarbonate material used for casings for common electrical devices generally has to have flame retardance (FR) that meets the property requirement of UL94 V0.

To meet a higher requirement on application, low-temperature impact resistance property, in particular notched impact strength, of polycarbonate material still needs to be improved. Addition of an impact modifier to a polycarbonate material helps improving the low-temperature impact resistance property, but meanwhile will also sacrifice part of the flame retardance property. Addition of a flame retardant can provide a better flame retardance property, but accordingly will reduce the low-temperature impact resistance property. Therefore, how to balance the flame retardance property and the impact resistance property of a polycarbonate material is a challenge in the industrial application field.

To improve the low-temperature impact resistance property while keeping a good flame retardance property, the prior technical solution adds polysiloxane-polycarbonate copolymer to the polycarbonate material. Polysiloxane-polycarbonate copolymer has good low-temperature impact resistance property, and the addition thereof does not affect the flame retardance property of the polycarbonate composition.

WO2015/022676 discloses the use of polycarbonate-polysiloxane copolymer (an opaque resin having a siloxane content of 20%) when filling a polycarbonate composition having flame retardance with minerals modified with an impact modifier. The addition of mineral fillers and phosphate flame retardant increases the flame retardance, but makes the impact resistance property of the polycarbonate composition worse, while the addition of the polycarbonate-polysiloxane copolymer increases the impact property and meanwhile does not reduce the flame retardance. US2009/0088514 discloses the use of a transparent polysiloxane-polycarbonate copolymer in a PC/ABS/talcum powder mixture with diphenyl phosphate (BDP) as the flame retardant so as to provide the article with better impact resistance property, flame retardance and surface quality. U.S. Pat. No. 8,841,367B2 discloses that combination of a polysiloxane-polycarbonate copolymer with a branched polycarbonate in a glass fiber-reinforced flame retardant polycarbonate can bring better impact resistance property and flame retardance property. U.S. Pat. No. 8,927,661B2 discloses that the synergistic effect between a polysiloxane-polycarbonate copolymer and phosphazene can be realized when combined with a branched polycarbonate in the development of transparent flame retardant polycarbonate materials. US2016/194495 A1 discloses polycarbonate compositions comprising polycarbonate, an impact modifier, a phosphazene and low amounts of a polysioxane-polycarbonate. This document does not provide any low temperature impact strength data. US 2014/107264 A1 is directed to compositions comprising polycarbonate, a polycarbonate-polysiloxane and a phosphazene. US2017/247539 A1 discloses compositions comprising polycarbonate, a polycarbonate-polysiloxane, an impact modifier and a linear phosphazene.

Although the above prior technical solutions can provide polycarbonate materials with a relatively good flame retardance property, but can hardly meet the requirement of a higher flame retardant level UL94 5VB and meanwhile a low-temperature impact resistance property at a temperature down to −40° C. Since the casings for some electrical devices or elements and the electrical devices for outdoor use, such as casings for network equipment, projectors, power packs of electromobiles, etc. release relatively much heat at work, polycarbonate material should satisfy a higher flame retardant level (such as UL94 5VB) and a good low-temperature impact resistance property.

Therefore, the industry needs to develop a new polycarbonate composition having both a high flame retardant level and an excellent low-temperature impact resistance property.

SUMMARY OF THE INVENTION

One of the objects of the present invention is to provide a polycarbonate composition, comprising
A) 8-70 wt. % of a polycarbonate component,
B) 25-90 wt. % of a polysiloxane-polycarbonate copolymer component,
C) a flame retardant component, which comprises 0.5-6 wt. % of a cyclic phosphazene of formula (X)

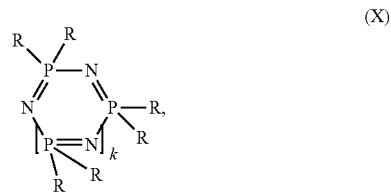

wherein,
k represents 1 or an integer from 1 to 10, preferably an integer from 1 to 8, particularly preferably from 1 to 5, having a trimer content (k=1) of from 60 to 98 mol %, based on component C,
and wherein
R is in each case identical or different and represents an amine group; $C_1$- to $C_8$-alkyl, preferably methyl, ethyl, propyl or butyl, each optionally halogenated, preferably halogenated with fluorine; $C_1$- to $C_8$-alkoxy, preferably methoxy, ethoxy, propoxy or butoxy; $C_5$- to $C_6$-cycloalkyl, each optionally substituted by alkyl, preferably $C_1$-$C_4$-alkyl, and/or by halogen, preferably chlorine and/or bromine; $C_6$- to $C_{20}$-aryloxy, preferably phenoxy, naphthoxy, each optionally substituted by alkyl, preferably $C_1$-$C_4$-alkyl, and/or by halogen, preferably chlorine, bromine, and/or by hydroxy; $C_7$- to $C_{12}$-aralkyl, preferably phenyl-$C_1$-$C_4$-alkyl, each optionally substituted by alkyl, preferably $C_1$-$C_4$-alkyl, and/or by halogen, preferably chlorine and/or bromine; or a halogen group, preferably chlorine; or an OH group, and D) an impact modifier component, which comprises 0.5-6 wt. % of methyl methacrylate-butadiene-styrene, with the above weight percentages based on said polycarbonate composition as 100 wt. %.

Another object of the present invention is to provide a process for the production of a polycarbonate composition, comprising the following steps:

mixing the components for the preparation of said polycarbonate composition, said components including: A) 8-70 wt. % of a polycarbonate component, B) 25-90 wt. % of a polysiloxane-polycarbonate copolymer component, C) a flame retardant component, which comprises 0.5-6 wt. % of a cyclic phosphazene of formula (X)

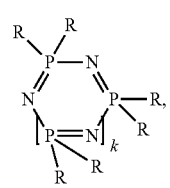

(X)

wherein, k represents 1 or an integer from 1 to 10, preferably an integer from 1 to 8, particularly preferably from 1 to 5, having a trimer content (k=1) of from 60 to 98 mol %, based on component C, and wherein R is in each case identical or different and represents an amine group; $C_1$- to $C_8$-alkyl, preferably methyl, ethyl, propyl or butyl, each optionally halogenated, preferably halogenated with fluorine; $C_1$- to $C_8$-alkoxy, preferably methoxy, ethoxy, propoxy or butoxy; $C_5$- to $C_6$-cycloalkyl, each optionally substituted by alkyl, preferably $C_1$-$C_4$-alkyl, and/or by halogen, preferably chlorine and/or bromine; $C_6$- to $C_{20}$-aryloxy, preferably phenoxy, naphthoxy, each optionally substituted by alkyl, preferably $C_1$-$C_4$-alkyl, and/or by halogen, preferably chlorine, bromine, and/or by hydroxy; $C_7$- to $C_{12}$-aralkyl, preferably phenyl-$C_1$-$C_4$-alkyl, each optionally substituted by alkyl, preferably $C_1$-$C_4$-alkyl, and/or by halogen, preferably chlorine and/or bromine; or a halogen group, preferably chlorine; or an OH group, and D) an impact modifier component, which comprises 0.5-6 wt. % of methyl methacrylate-butadiene-styrene, with the above weight percentages based on said polycarbonate composition as 100 wt. %.

A further object of the present invention is to include the molded articles of the polycarbonate composition provided in the present invention.

The polycarbonate composition and the molded articles provided according to the present invention have a high flame-retardant level, an excellent low-temperature impact-resistant property and good heat resistance, and are suitable for the use requirement of casings for electrical devices which have relatively high flame-retardant levels (such as UL94 5VB) and require an excellent low-temperature impact-resistant property.

SPECIFIC EMBODIMENTS

The present invention is described with the purpose of explanation rather than limitation here. Unless in specific Examples or otherwise indicated, all the numbers in the description which represent amount, percent, etc. are understood as being modified with the term "about" in all cases.

In the present invention, the use of the inventive combination of a polycarbonate component, a polysiloxane-polycarbonate copolymer component, a methyl methacrylate-butadiene-styrene component, and a phosphazene compound realizes the high flame retardance property and the strong impact-resistant property of the polycarbonate composition. The flame-retardant level of the polycarbonate composition provided by the present invention can reach the flame retardance property UL94 5VB (test conditions: 1.5 mm, 2 days, 23° C.) and the flame retardance property V0 level (test conditions: 1.0 mm, 2 days, 23° C.), and meanwhile can satisfy the requirement of the low-temperature impact strength at a temperature down to −40° C. (Izod test conditions: −40° C., 3 mm, 5.5 J).

The present invention provides a polycarbonate composition and the process for the production and molded articles thereof. Said polycarbonate composition has a good low-temperature impact resistance property (e.g. notched impact strength at a temperature down to −20° C. and −40° C.), and meanwhile can reach a relatively high flame-retardant level (such as UL94 5VB).

The polycarbonate composition provided according to the present invention comprises:

A) 8-70 wt. % of a polycarbonate component,

B) 25-90 wt. % of a polysiloxane-polycarbonate copolymer component,

C) a flame retardant component, which comprises 0.5-6 wt. % of a cyclic phosphazene of formula (X)

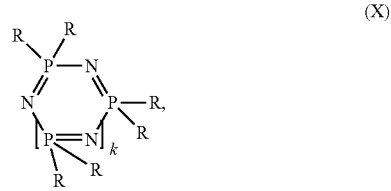

(X)

wherein, k represents 1 or an integer from 1 to 10, preferably an integer from 1 to 8, particularly preferably from 1 to 5, having a trimer content (k=1) of from 60 to 98 mol %, based on component C, and wherein R is in each case identical or different and represents an amine group; $C_1$- to $C_8$-alkyl, preferably methyl, ethyl, propyl or butyl, each optionally halogenated, preferably halogenated with fluorine; $C_1$- to $C_8$-alkoxy, preferably methoxy, ethoxy, propoxy or butoxy; $C_5$- to $C_6$-cycloalkyl, each optionally substituted by alkyl, preferably $C_1$-$C_4$-alkyl, and/or by halogen, preferably chlorine and/or bromine; $C_6$- to $C_{20}$-aryloxy, preferably phenoxy, naphthoxy, each optionally substituted by alkyl, preferably $C_1$-$C_4$-alkyl, and/or by halogen, preferably chlorine, bromine, and/or by hydroxy; $C_7$- to $C_{12}$-aralkyl, preferably phenyl-$C_1$-$C_4$-alkyl, each optionally substituted by alkyl, preferably C$_1$-C$_4$-alkyl, and/ or by halogen, preferably chlorine and/or bromine; or a halogen group, preferably chlorine; or an OH group, and D) an impact modifier component, which comprises 0.5-6 wt. % of methyl methacrylate-butadiene-styrene, with the above weight percentages based on said polycarbonate composition as 100 wt. %.

Component A: A Polycarbonate Component

Component A is a polycarbonate component. The polycarbonate component is in a content of 8-70 wt. %, preferably 10-65 wt. %, more preferably 10-60 wt. %, based on said polycarbonate composition as 100 wt. %.

Suitable polycarbonates include aromatic polycarbonates and/or aromatic polyester carbonates prepared according to known literature, or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 007 934).

The preparation of aromatic polycarbonates is carried out, for example, by reaction of diphenols with carbonic acid halides, preferably phosgene, and/or with aromatic dicarboxylic acid halids, preferably benzenedicarboxylic acid dihalides, according to the phase interfacial process, optionally using chain terminators, for example monophenols, and optionally using branching agents having a functionality of three or more than three, for example triphenols or tetraphenols. Preparation by a melt polymerization process by reaction of diphenols with, for example, diphenyl carbonate is also possible.

Diphenols for the preparation of the aromatic polycarbonates and/or aromatic polyester carbonates are preferably those of formula (1)

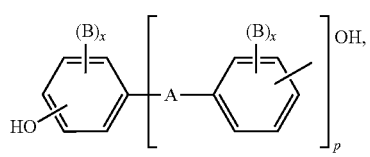

(1)

wherein

A is a single bond, C$_1$- to C$_5$-alkylene, C$_2$- to C$_5$-alkylidene, C$_5$- to C$_6$-cycloalkylidene, —O—, —SO—, —CO—, —S—, —SO$_2$—, C$_6$- to C$_{12}$-arylene, to which further aromatic rings optionally containing heteroatoms can be fused, or a group of formula (2) or (3)

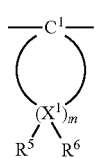

(2)

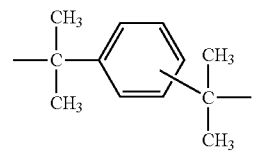

(3)

B is in each case C$_1$- to C$_{12}$-alkyl, preferably methyl, halogen, preferably chlorine and/or bromine, x each independently of the other is 0, 1 or 2, p is 1 or 0, and R$^5$ and R$^6$ can be chosen individually for each X$^1$ and each independently of the other is hydrogen or C$_1$- to C$_6$-alkyl, preferably hydrogen, methyl or ethyl, X$^1$ is carbon and m is an integer from 4 to 7, preferably 4 or 5, with the proviso that on at least one atom X$^1$, R$^5$ and R$^6$ are simultaneously alkyl.

Preferred diphenols are hydroquinone, resorcinol, dihydroxydiphenols, bis-(hydroxyphenyl)-C$_1$-C$_5$-alkanes, bis-(hydroxyphenyl)-C$_5$-C$_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols are 4,4'-dihydroxybiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl-cyclohexane, 4,4'-dihydroxydiphenyl sulfide, 4,4'-dihydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxy-phenyl)-propane. 2,2-Bis-(4-hydroxyphenyl)-propane (bisphenol B) is particularly preferred.

The diphenols can be used alone or in the form of any mixture. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a each case.

The thermoplastic aromatic polycarbonates have mean molecular weights (weight-average M, measured by GPC (gel permeation chromatography) with polycarbonate standard) of from 15,000 to 80,000 g/mol, preferably from 19,000 to 32,000 g/mol, particularly preferably from 22,000 to 30,000 g/mol.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups. Preference is given to the use of linear polycarbonates, more preferably polycarbonates based on bisphenol A.

Both homopolycarbonates and copolycarbonates are suitable. For the preparation of copolycarbonates suitable for the component A of the invention, it is also possible to use from 1 to 25 wt. %, preferably from 2.5 to 25 wt. %, based on the total amount of diphenols used, of polydiorganosiloxanes having hydroxyaryloxy end groups. These are known (U.S. Pat. No. 3,419,634) and can be prepared according to processes known in the literature. Also suitable are copolycarbonates containing polydiorganosiloxanes; the preparation of the copolycarbonates containing polydiorganosiloxanes is described, for example, in DE-A 3 334 782.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred. In the preparation of polyester carbonates, a carbonic acid halide, preferably phosgene, is additionally used concomitantly as bifunctional acid-derivative.

Suitable chain terminators for the preparation of the aromatic polyester carbonates, in addition to the monophenols already mentioned, are also the chlorocarbonate thereof and the acid chlorides of aromatic monocarboxylic acids, which can optionally be substituted by $C_1$- to $C_{22}$-alkyl or by halogen atoms, as well as aliphatic $C_2$- to $C_{22}$-monocarboxylic acid chlorides.

The amount of chain terminators is in each case from 0.1 to 10 mol %, based in the case of phenolic chain terminators on mol of diphenol and in the case of monocarboxylic acid chloride chain terminators on mol of dicarboxylic acid dichloride.

One or more aromatic hydroxycarboxylic acids can additionally be used in the preparation of aromatic polyester carbonates.

The aromatic polyester carbonates can be both linear and branched in known manner (see in this connection DE-A 2 940 024 and DE-A 3 007 934), linear polyester carbonates being preferred.

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-(6-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, or 1,4-bis[4,4'-dihydroxytriphenyl)-methyl]-benzene, in amounts of from 0.01 to 1.0 mol % (based on diphenols used). Phenolic branching agents can be placed beforehand in a vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters moieties and the carbonates moieties in the aromatic polyester carbonates can be present in the form of blocks or distributed randomly in the polycondensation product.

The thermoplastic aromatic polycarbonates and polyester carbonates can be used alone or in any mixture.

Component B: A Polysiloxane-Polycarbonate Copolymer Component

Component B is a polysiloxane-polycarbonate copolymer in an amount of 25-90 wt. %, preferably 25-85 wt. %, more preferably, 26-80 wt.-%, still more preferably 27-70 wt.-%, still more preferably 28-60 wt.-% and most preferably 29 to 50 wt.-% based on said polycarbonate composition as 100 wt. %.

According to the invention, suitable polysiloxane-polycarbonate copolymers are known in the prior art, or can be prepared by processes known in the prior art literature.

Polydiorganosiloxane (also named as "siloxane" in the present text) block of the polysiloxane-polycarbonate copolymer includes polydiorganosiloxane blocks as in formula (4):

wherein, each R is independently a $C_{1-13}$ monovalent organic group. For example, R may be $C_1$-$C_{13}$ alkyl, $C_1$-$C_{13}$ alkoxy, a $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The above groups can be fully or partly halogenated by fluorine, chlorine, bromine or iodine or combinations thereof. The combination of the above R groups can be used in the same copolymers.

The value of E in formula (4) can vary widely depending on factors like the type and the relative content of each component in the polycarbonate composition of the present invention, and the desired property of the composition, etc. Generally, E has an average value of 2 to 1,000, preferably 3 to 500, more preferably, 5 to 100. In an embodiment, E has an average value of 10 to 75, preferably of 10 to 40, and in still another embodiment, E has an average value of 40 to 60. In the case where E is a relatively low value, e.g., less than 40, it may be desired to use a relatively large amount of a polysiloxane-polycarbonate copolymer. On the contrary, in the case where E is a relatively high value, e.g., larger than 40, a relatively small amount of a polysiloxane-polycarbonate copolymer can be used.

Component B may also be a combination comprising a first polysiloxane-polycarbonate copolymer and a second polysiloxane-polycarbonate copolymer, wherein the average value of E in the first polysiloxane-polycarbonate copolymer is smaller than the average value of E in the second polysiloxane-polycarbonate copolymer.

In an embodiment, polysiloxane blocks are of formula (5):

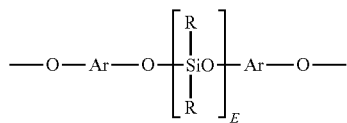

wherein, E is as defined above; each R may be identical or different, and is as defined above; and Ar may be identical or different, and is a substituted or unsubstituted $C_6$-$C_{30}$ arylene group, wherein, the chain is directly connected to an aromatic moiety. Ar group in formula (5) may be derived from a $C_5$-$C_{30}$ dihydroxyarylene compound.

In another embodiment, polysiloxane blocks are of formula (6):

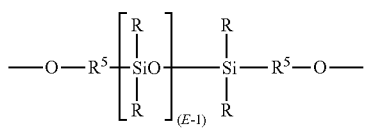

wherein, R and E are as defined above, and each $R^5$ is independently a divalent $C_1$-$C_{30}$ organic group, and wherein, the polymerized polysiloxane block is the reaction residue of the corresponding dihydroxy compound. In a specific embodiment, polysiloxane blocks are of formula (7):

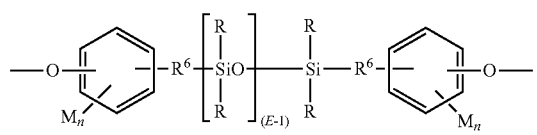

wherein, R and E are as defined above. $R^6$ in formula (7) is a divalent $C_2$-$C_8$ aliphatic group. Each M in formula (7) can be identical or different, and can be halogen, amino, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ aralkoxy, $C_7$-$C_{12}$ alkylaryl, or $C_7$-$C_{12}$ alkylaryloxy, wherein, each n is independently 0, 1, 2, 3 or 4.

In an embodiment, M is bromine or chlorine, an alkyl group such as methyl, ethyl or propyl, an alkoxyl group such as methoxyl, ethoxyl, or propoxyl, or an aryl group such phenyl, chlorophenyl or tolyl; $R^6$ is a dimethylene, trimethylene or tetramethylene group; and R is $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In a further embodiment, M is methoxyl, n is 1, $R^6$ is a divalent $C_1$-$C_3$ aliphatic group, and R is methyl.

Specific polydiorganosiloxane blocks are of the following formula (8), (9), (10):

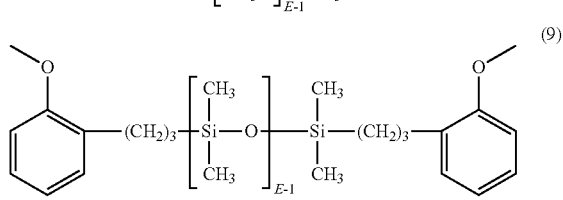

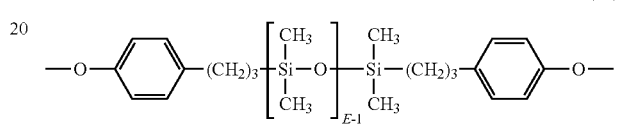

or a combination comprising at least one of the above, wherein, E has an average value of 2-200, 2-125, 5-125, 5-100, 5-50, 20-80 or 5-20.

In an embodiment, blocks of formula (4) can be derived from the corresponding dihydroxy polysiloxane (11):

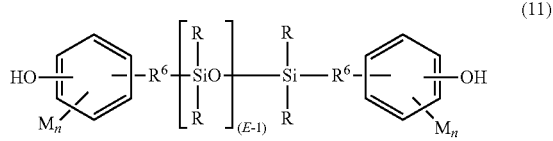

wherein, R, E, M, $R^6$ and n are as described above. Such dihydroxy polysiloxane can be prepared by effecting a platinum-catalyzed addition in a siloxane hydride of formula (12):

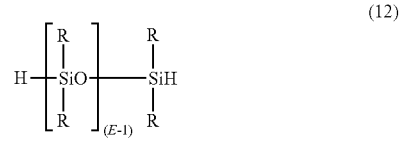

wherein, R and E are as defined above, being an aliphatic unsaturated monohydric phenol. Exemplary aliphatic unsaturated monohydric phenols include eugenol, 2-alkylphenol, 4-allyl-2-methylphenol, 4-allyl-2-phenylphenol, 4-allyl-2-bromophenol, 4-allyl-2-tert-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, and 2-allyl-4,6-dimethylphenol. A combination comprising at least one of the above may also be used.

In a preferred embodiment the siloxane blocks of the polysiloxane-polycarbonate copolymer can be derived from the corresponding dihydroxy polysiloxane (I):

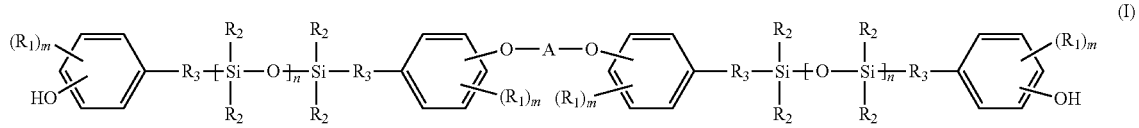

wherein, in this formula (I),
R1, independently represents hydrogen atom, halogen atom, hydroxy group, alkyl group having 1 to 20 carbon atoms, alkoxy group or aryl group, preferably a hydrogen atom;
R2 independently represents hydrocarbon group having 1 to 13 carbon atoms or hydroxy group, preferably a methyl group;
R3 independently represents alkylene group having 2 to 8 carbon atoms, preferably 3 carbon atoms;
m independently represents an integer of 0 to 4, preferably 0;
n independently represents an integer of 1 to 200, preferably the values of E as given above;
A represents a structure of the following chemical formula (II):

X represents polynuclear arylene group which has 6 to 30 carbon atoms and is unsubstituted or substituted with halogen atom, alkyl group, alkoxy group, aryl group or carboxy group, preferably an unsubstituted arylene group.

The polysiloxane-polycarbonate copolymer may comprise 50 wt. % to 99 wt. % of carbonate units and 1-50 wt. % of siloxane units. Within this range, the polysiloxane-polycarbonate copolymer may comprise preferably 70-98 wt. %, more preferably 75-97 wt. % of carbonate units and preferably 2-30 wt. %, more preferably 3-25 wt. %, still more preferably 4 to 10 wt.-% and most preferably 5 to 9 wt.-% of siloxane units. In an exemplary embodiment, the polysiloxane-polycarbonate copolymer is end capped with p-cumylphenol.

In an embodiment, an exemplary polysiloxane-polycarbonate copolymer is a block copolymer having the structure as shown in the following formula (13):

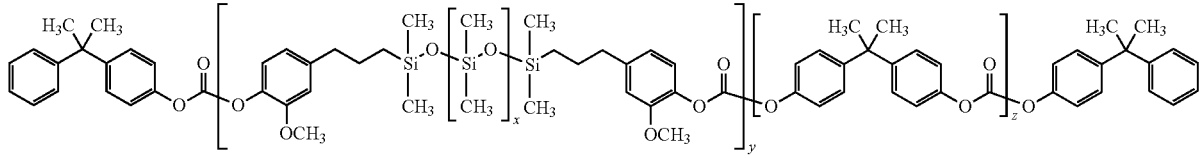

wherein, the polysiloxane blocks are end capped with eugenol, wherein, x is 1-100, preferably 5-85, more preferably 10-70, particularly preferably 15-65, and most preferably 40-60. In an embodiment, y is 1-90, and z is 1-600. The polysiloxane block can be distributed randomly or distributed in control among the polycarbonate blocks. In an embodiment, x is 30-50, y is 10-30, and z is 450-600.

In an embodiment, the polysiloxane-polycarbonate copolymer comprises 4-10 wt. %, preferably 5-9 wt. %, more preferably 6-9 wt. % of polysiloxane, based on the total weight of the polysiloxane-polycarbonate copolymer. Polysiloxane-polycarbonate copolymers comprising 10 wt % or less of polysiloxane are generally optically transparent.

In another embodiment, the polysiloxane-polycarbonate copolymer comprises 10 wt. % or more, specifically, 12 wt. % or more, and more specifically, 14 wt. % or more of polysiloxane, based on the total weight of the polysiloxane-polycarbonate copolymer. Polysiloxane-polycarbonate copolymers comprising 10 wt. % or more of polysiloxane are generally optically opaque.

The polysiloxane-polycarbonate copolymer can have a weight average molecular weight of 2,000-100,000 Dalton, specifically, 5,000 to 50,000 Dalton measured by gel permeation chromatography using cross-linked styrene-divinyl benzene column at a sample concentration of, e.g., 1 mg/ml, and calibrating with polycarbonate standard.

The polysiloxane-polycarbonate copolymer can have a melt volume flow rate of 1-50 cm$^3$/10 min (cc/10 min), preferably, 2-30 cc/10 min measured at 300° C./1.2 kg. A mixture of polysiloxane-polycarbonate copolymers having different flow features may be used for obtaining an overall desired flow feature.

Component C: A Flame Retardant Component

Component C) is a flame retardant component, which comprises 0.5-6 wt. %, preferably 1-6 wt. %, more preferably, 2-6 wt. % and most preferably 2 to 4 wt.-% of a cyclic phosphazene of formula (X)

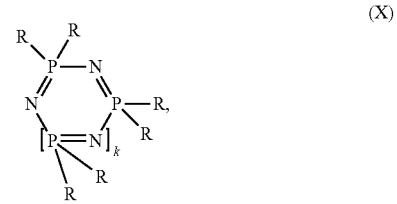

wherein,
k represents 1 or an integer from 1 to 10, preferably an integer from 1 to 8, particularly preferably from 1 to 5, having a trimer content (k=1) of from 60 to 98 mol %, based on component C,
and wherein
R is in each case identical or different and represents an amine group; $C_1$- to $C_8$-alkyl, preferably methyl, ethyl, propyl or butyl, each optionally halogenated, preferably halogenated with fluorine; $C_1$- to $C_8$-alkoxy, preferably methoxy, ethoxy, propoxy or butoxy; $C_5$- to $C_6$-cycloalkyl, each optionally substituted by alkyl, preferably $C_1$-$C_4$-alkyl, and/or by halogen, preferably chlorine and/or bromine; $C_6$- to $C_{20}$-aryloxy, preferably phenoxy, naphthoxy, each optionally substituted by alkyl, preferably $C_1$-$C_4$-alkyl, and/or by halogen, preferably chlorine, bromine, and/or by hydroxy; $C_7$- to $C_{12}$-aralkyl, preferably phenyl-$C_1$-$C_4$-alkyl, each optionally substituted by alkyl, preferably $C_1$-$C_4$-alkyl, and/or by halogen, preferably chlorine and/or bromine; or a halogen group, preferably chlorine; or an OH group, the weight percentages based on said polycarbonate composition as 100 wt. %.

Said cyclic phosphazene is preferably:

propoxyphosphazene, phenoxyphosphazene, methylphenoxyphosphazene, aminophosphazene and fluoroalkylphosphazenes, as well as phosphazenes having the following structures:

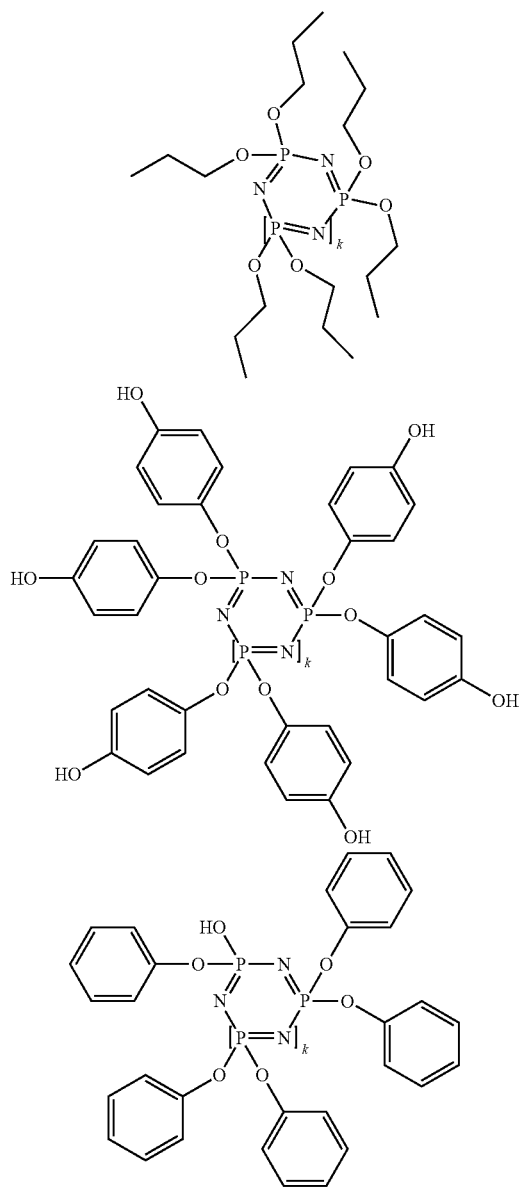

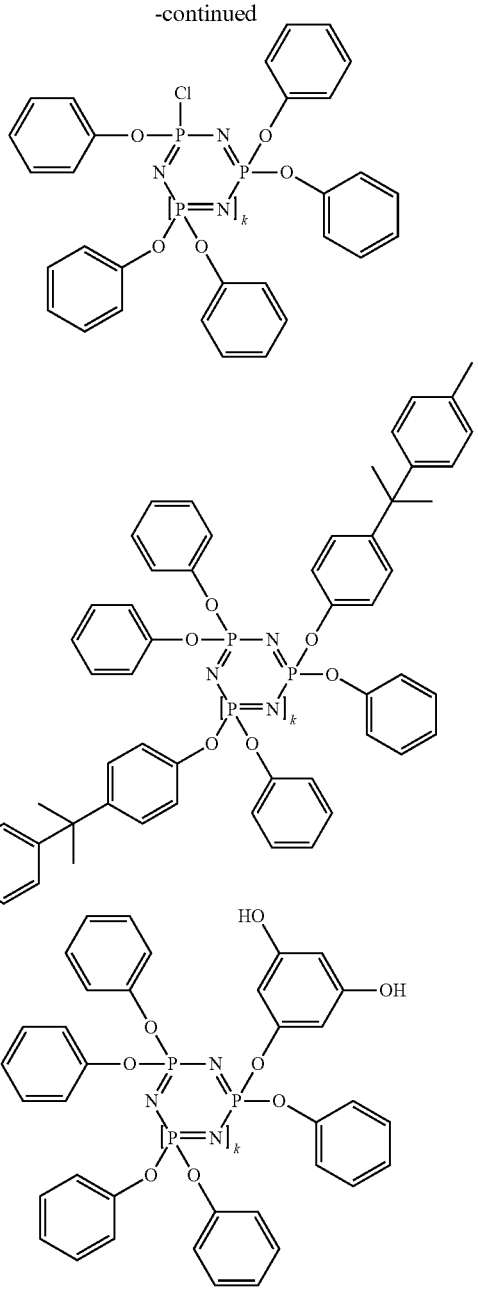

In the compounds shown above, k=1, 2 or 3.

Preference is given to phenoxyphosphazene (all R=phenoxy) having a content of oligomers with k=1 (C1) of from 60 to 98 mol %.

In the case where the phosphazene according to formula (X) is halo-substituted on the phosphorus, for example from incompletely reacted starting material, the content of this phosphazene halo-substituted on the phosphorus is preferably less than 1,000 ppm, more preferably less than 500 ppm.

The phosphazenes can be used alone or in the form of a mixture, that is to say the group R can be identical, or two or more groups in formula (X) can be different. The groups R of a phosphazene are preferably identical.

In a further preferred embodiment, only phosphazenes with identical R are used.

Preferably, where the content of any trimer (k=1), tetramer (k=2), oligophosphazene (k=3, 4, 5, 6 and/or 7 and/or) and/or phosphazene oligomers with k≥8 is indicated in mol-% according to the present invention, this mol-% is based on the cyclic phosphazene of formula (X).

In a preferred embodiment, the content of tetramers (k=2) (C2) is from 2 to 50 mol %, based on component C, more preferably from 5 to 40 mol %, yet more preferably from 10 to 30 mol %, particularly preferably from 10 to 20 mol %.

In a preferred embodiment, the content of higher oligophosphazenes (k=3, 4, 5, 6 and 7) (C3) is from 0 to 30 mol %, based on component C, more preferably from 2.5 to 25 mol %, yet more preferably from 5 to 20 mol % and particularly preferably from 6 to 15 mol %.

In a preferred embodiment, the content of oligomers with k≥8 (C4) is from 0 to 2.0 mol %, based on component C, and preferably from 0.10 to 1.00 mol %.

In a further preferred embodiment, the phosphazenes of component C fulfil all three conditions mentioned above as regards the contents (C2-C4).

Component C preferably comprises, more preferably is a phenoxyphosphazene with a trimer content (k=1) of from 65 to 85 mol %, a tetramer content (k=2) of from 10 to 20 mol %, a content of higher oligophosphazenes (k=3, 4, 5, 6 and 7) of from 5 to 20 mol % and of phosphazene oligomers with k≥8 of from 0 to 2 mol %, based on component C.

Component C particularly preferably comprises, more preferably is a phenoxyphosphazene with a trimer content (k=1) of from 70 to 85 mol %, a tetramer content (k=2) of from 10 to 20 mol %, a content of higher oligophosphazenes (k=3, 4, 5, 6 and 7) of from 6 to 15 mol % and of phosphazene oligomers with k≥8 of from 0.1 to 1 mol %, based on component C.

In a further particularly preferred embodiment, component C comprises, preferably is a phenoxyphosphazene with a trimer content (k=1) of from 65 to 85 mol %, a tetramer content (k=2) of from 10 to 20 mol %, a content of higher oligophosphazenes (k=3, 4, 5, 6 and 7) of from 5 to 15 mol % and of phosphazene oligomers with k≥8 of from 0 to 1 mol %, based on component C.

As mentioned above, in these embodiments it is further preferred that the trimer content (k=1), tetramer content (k=2), oligophosphazene content (k=3, 4, 5, 6 and/or 7) and/or content of phosphazene oligomers with k≥8 is based on the cyclic phosphazene of formula (X).

n defines the weighted arithmetic mean of k according to the following formula:

$$n = \frac{\sum_{i=1}^{max} k_i \cdot x_i}{\sum_{i=1}^{max} x_i}$$

where $x_i$ is the content of the oligomer $k_i$, and the sum of all $x_i$ is accordingly 1.

In an alternative embodiment, n is in the range from 1.10 to 1.75, preferably from 1.15 to 1.50, more preferably from 1.20 to 1.45, and particularly preferably from 1.20 to 1.40 (including the limits of the ranges).

The phosphazenes and their preparation are described, for example, in EP-A 728 811, DE-A 1 961668 and WO 97/40092.

The oligomer compositions of the phosphazenes in the blend samples can also be detected and quantified, after compounding, by means of $^{31}$P NMR (chemical shift; δ trimer: 6.5 to 10.0 ppm; δ tetramer: −10 to −13.5 ppm; δ higher oligomers: −16.5 to −25.0 ppm).

Component C) may also include other flame retardants usually used in the industry.

Component D: An Impact Modifier

Component D), an impact modifier component, comprises 0.5-6 wt. % of methyl methacrylate-butadiene-styrene (MBS), based on said polycarbonate composition as 100 wt. %.

Said methyl methacrylate-butadiene-styrene has butadiene or butadiene-styrene copolymer as the rubber phase, of which the weight percent is 60-85 wt. %, preferably 65-80 wt. %, more preferably 70-80 wt. %, based on said methyl methacrylate-butadiene-styrene as 100 wt. %. Said methyl methacrylate-butadiene-styrene preferably has PMMA or PMMA-styrene copolymer as the graft layer.

Impact modifiers methyl methacrylate-butadiene-styrenes suitable for component D) include butadiene or butadiene-styrene rubber-based core-shell impact modifiers, preferably, butadiene or butadiene-styrene rubber-based impact modifiers grafted with methyl methacrylate or methyl methacrylate-styrene copolymer, e.g., Kane Ace M732 purchased from Kaneka, Paraloid EXL2650J, EXL2690, EXL2691J purchased from Dow Chemicals, etc.

Component D) may also include other impact modifiers usually used in the industry.

Component E: An Anti-Dripping Agent

The polycarbonate composition according to the invention may further comprise an anti-dripping agent. There are used as anti-dripping agents preferably polytetrafluoroethylene (PTFE) or PTFE-containing compositions such as, for example, masterbatches of PTFE with styrene- or methyl methacrylate-containing polymers or copolymers.

The anti-dripping agent is used in an amount of 0.05-1 wt. %, preferably 0.2-0.9 wt. %, more preferably 0.3-0.8 wt. %, with the polycarbonate composition as 100 wt. %.

The fluorinated polyolefins used as anti-dripping agents have a high molecular weight and have glass transition temperatures of over −30° C., generally over 100° C., fluorine contents of preferably from 65 to 76 wt. %, in particular from 70 to 76 wt. % (with the fluorinated polyolefins as 100 wt. %), mean particle diameters $d_{50}$ of from 0.05 to 1,000 µm, preferably from 0.08 to 20 µm. In general, the fluorinated polyolefins have a density of from 1.2 to 2.3 g/cm$^3$. Preferred fluorinated polyolefins are polytetrafluoroethylene, polyvinylidene fluoride, tetrafluoroethylene/hexafluoropropylene copolymer and ethylene/tetrafluoroethylene copolymer. The fluorinated polyolefins are known (see "Vinyl and Related Polymers" by Schildknecht, John Wiley & Sons, Inc., New York, 1962, pages 484-494; "Fluoropolymers" by Wall, Wiley-Interscience, John Wiley & Sons, Inc., New York, Volume 13, 1970, pages 623-654; "Modern Plastics Encyclopedia", 1970-1971, Volume 47, No. 10 A, October 1970, McGraw-Hill, Inc., New York, pages 134 and 774; "Modern Plastics Encyclopaedia", 1975-1976, October 1975, Volume 52, No. 10 A, McGraw-Hill, Inc., New York, pages 27, 28 and 472 and U.S. Pat. Nos. 3,671,487, 3,723,373 and 3,838,092).

They can be prepared by known processes, for example by polymerization of tetrafluoroethylene in an aqueous medium with a free radical-forming catalyst, for example sodium, potassium or ammonium peroxodisulfate, at pressures of from 7 to 71 kg/cm$^2$ and at temperatures of from 0 to 200° C., preferably at temperatures of from 20 to 100° C. (For further details see e.g. U.S. Pat. No. 2,393,967.) Depending on the form in which they are used, the density of these materials can be from 1.2 to 2.3 g/cm³, and the mean particle size can be from 0.05 to 1000 µm.

The fluorinated polyolefins that are preferred according to the invention have mean particle diameters of from 0.05 to 20 µm, preferably from 0.08 to 10 µm, and density of from 1.2 to 1.9 g/cm³.

Suitable fluorinated polyolefins which can be used in powder form are tetrafluoroethylene polymers having mean particle diameters of from 100 to 1000 µm and densities of from 2.0 g/cm³ to 2.3 g/cm³. Suitable tetrafluoroethylene polymer powders are commercial products and are supplied, for example, by DuPont under the trade name Teflon®.

Other Additives

The polycarbonate compositions according to the invention may further include suitable additives usually used in the industry, for example, lubricants and demolding agents (for example pentaerythritol tetrastearate), nucleating agents, stabilisers (for example UV/light stabilisers, heat stabilisers, antioxidants, transesterification inhibitors, hydrolytic stabilisers), antistatics (for example conductive carbon black, carbon fibres, carbon nanotubes as well as organic antistatics such as polyalkylene ethers, alkyl sulfonates or polyamide-containing polymers) as well as dyes, pigments, fillers and reinforcing materials, in particular glass fibres, mineral reinforcing materials and carbon fibres. Apart from these, the composition may comprise further conventional polymer additives, such as flame-retardant synergists.

There are preferably used as stabilizers sterically hindered phenols and phosphites or mixtures thereof, such as, for example, Irganox® B900 (Ciba Speciality Chemicals). Pentaerythritol tetrastearate is preferably used as the demolding agent. In addition, a black pigment (e.g. Blackpearls) is preferably added.

As well as comprising optional further additives, particularly preferred molding compositions comprise a demolding agent, particularly preferably pentaerythritol tetrastearate, in an amount of from 0.1 to 1.5 parts by weight, preferably from 0.2 to 1.0 part by weight, particularly preferably from 0.3 to 0.8 parts by weight.

As well as comprising optional further additives, particularly preferred molding compositions comprise at least one stabilizer, for example selected from the group of the sterically hindered phenols, phosphites and mixtures thereof and particularly preferably Irganox® B900, in an amount of from 0.01 to 0.5 parts by weight, preferably from 0.03 to 0.4 parts by weight, particularly preferably from 0.06 to 0.3 parts by weight.

The polycarbonate compositions provided according to the invention, as well as comprising components A), B), C), D) or A), B), C), D), E) and other additives listed in the invention, may further comprise components that are generally used for the preparation of polycarbonate materials in the industry, and the total weight of all these components is calculated as 100 wt. %, wherein, preferred solutions include that the total sum of components A), B), C), D) is 100 wt. %, or the total sum of components A), B), C), D), E) is 100 wt. %, or the total sum of components A), B), C), D) and other additives is 100 wt. %, or the total sum of components A), B), C), D), E) and other additives is 100 wt. %.

The polycarbonate compositions according to the invention may be prepared and used according to the conventional processes known by persons skilled in the art, for example, prepared according to a process comprising the following steps: 1) premixing an impact modifier, a flame retardant and other additives (such as demolding agents, stabilizers) to obtain a premix; 2) mixing the premix with other components, such as a polycarbonate component, a polysiloxane-polycarbonate copolymer component; 3) granulating by, for example, a twin-screw extruder to obtain polycarbonate composition granules.

EXAMPLES

The following Examples aim at exemplifying rather than limiting.

Components used in Examples and the brief introduction thereof are as follows:

| Names | Description | Suppliers |
|---|---|---|
| M.2800 | BPA type polycarbonate, with a weight average molecular weight of about 28,000 g/mol | Covestro Co., Ltd. |
| M.2600 | BPA type polycarbonate, with a weight average molecular weight of about 26,000 g/mol | Covestro Co., Ltd. |
| M.2400 | BPA type polycarbonate, with a weight average molecular weight of about 24,000 g/mol | Covestro Co., Ltd. |
| polysiloxane-polycarbonate copolymer Trirex ST6-3022PJ(1) | polysiloxane-polycarbonate copolymer, with a siloxane content of 9% | Samyang |
| FS200 (PTFE MB) | anti-dripping agent, SAN coated PTFE | Han Nano tech Co., Ltd |
| Phosphazene Rabitle FP-110 | Phenoxyphosphazene of formula (XI) having a content of oligomers with k = 1 of 70 mol %, a content of oligomers with k = 2 of 18 mol % and a content of oligomers with k ≥ 3 of 12 mol %. | Fushimi Pharmaceutical Co., Ltd. |

| Names | Description | Suppliers |
|---|---|---|
| | 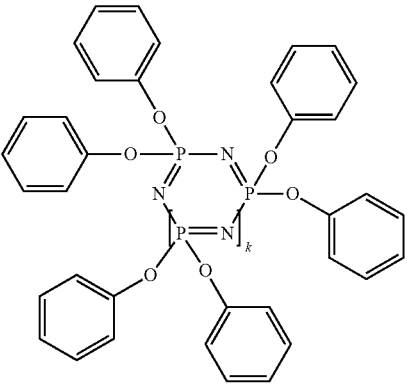 (XI) | |
| AKD STAB FP-800 | phosphate flame retardant | ADEKA Corporation |
| Kane ACE M732 | methyl methacrylate-butadiene-styrene impact modifier | KANEKA Corporation |
| Paraloid EXL2300 | acrylate impact modifier | Dow Chemicals |
| Paraloid EXL2311 | acrylate impact modifier | Dow Chemicals |
| Paraloid EXL2313 | acrylate impact modifier | Dow Chemicals |

In comparative Examples and inventive Examples, unless particularly explained, the amount in percent of each component refers to the weight percent of the component relative to the resulting polycarbonate composition, with polycarbonate composition as 100 wt. %.

The polycarbonate combination in the comparative Examples and the inventive Examples in the present invention were prepared by the following process: 1) premixing an impact modifier, a flame retardant and other additives for about 2 minutes by a high-speed mixer (Reimelt Henschel mixer, model No. FML40) to obtain a premix; 2) mixing the premix with other components, such as a polycarbonate component, a polysiloxane-polycarbonate copolymer component in a twin-screw extruder (apparatus and model No. Coperion ZSK26) and granulating by extrusion so as to obtain granules.

Produce test samples corresponding to the resulting polycarbonate composition granules according to the requirements of the test standards in Tables 1-4, and conduct the corresponding tests according to the corresponding test standards.

The weight average molecular weights of the polycarbonates used in the examples were measured by GPC (gel permeation chromatography) with polycarbonate standard.

Comparative Examples 1-7

Table 1 lists comparative Examples 1-7. In the comparative Examples listed in Table 1, phosphazene (FR-110) serves as the major flame retardant in the polycarbonate composition.

As shown in Table 1, with the increase of the addition amount of phosphazene from 2.5 wt. % to 4.5 wt % from comparative Example 1 to comparative Example 3, though the Vicat softening temperature of the polycarbonate compositions was maintained at a relatively high temperature (not lower than 134° C.), the flame-retardant level increased from V1 (test conditions: 1.0 mm, 2 days, 23° C.) to V0 (test conditions: 1.0 mm, 2 days, 23° C.). However, the flame-retardant level still failed to reach the requirement of UL94 5VB (test conditions: 2.0 mm, 2 days, 23° C.). Meanwhile, at low temperatures between −20° C. and −40° C., the notched impact strength was between 8.1 and 9.3 kJ/m², showing that the polycarbonate compositions exhibited brittleness, and the notched impact strength was not satisfying.

In comparative Examples 4-5, the addition amount of phosphazene was maintained at 2.5 wt. %, and 1 wt. % and 2 wt. % of methyl methacrylate-butadiene-styrene impact modifier Kane Ace M732 were added respectively to increase the impact strength, with the weight percent based on the polycarbonate composition as 100 wt. %. As shown in Table 1, though the polycarbonate compositions in comparative Examples 4-5 passed UL94 5VB standard, the flame-retardant property decreased from V1 (test conditions: 1.0 mm, 2 days, 23° C.) to V2 (test conditions: 1.0 mm, 2 days, 23° C.), and at low temperatures between −20° C. and −40° C., the notched impact strength increased but was not improved significantly, and only reached 12-16 kJ/m².

In comparative Examples 6-7, 40 wt. % of a polysiloxane-polycarbonate copolymer (ST6-3022PJ(1)) was added to increase the notched impact strength at low temperatures, with the weight percent based on the polycarbonate composition as 100 wt. %. As shown in Table 1, the low-temperature impact-resistant property of the polycarbonate compositions prepared in comparative Examples 6-7 increased significantly, which could reach 58 kJ/m² and 51 kJ/m² at −20° C. respectively, and the flame-retardant property increased from V2 (test conditions: 1.0 mm, 2 days, 23° C.) to V0 (test conditions: 1.0 mm, 2 days, 23° C.), but it no longer satisfied the requirement of flame-retardant level UL94 5VB (test conditions: 2.0 mm, 2 days, 23° C.).

Table 2 lists inventive Examples 1-6 of the polycarbonate compositions according to the invention.

Compared to comparative Examples 1-7, surprisingly, by adding 1 wt. % of methyl methacrylate-butadiene-styrene impact modifier, with the weight percent based on the polycarbonate composition as 100 wt. %, to the blend of polycarbonate, polysiloxane-polycarbonate copolymer and phosphazene, the inventive Example 1 made the polycarbonate composition reach the requirement of flame-retardant level UL94 5VB (test conditions: 1.5 mm, 2 days, 23° C.). Meanwhile, at low temperatures between −20° C. and −40° C., the notched impact strength could reach 59-51 kJ/m². The low-temperature impact-resistant property was improved.

In the inventive Example 2, by increasing the content of methyl methacrylate-butadiene-styrene impact modifier to 2 wt. %, with the weight percent based on the polycarbonate composition as 100 wt. %, the resulting polycarbonate composition reached flame-retardant level UL94 5VB (test conditions: 1.5 mm, 2 days, 23° C.). Meanwhile, at low temperatures between −20° C. and −40° C., the notched impact strength could reach 61-54 kJ/m². The low-temperature impact-resistant property was improved.

In view of the main failure mode which is burning and dripping of the tested material in the test of flame-retardant level UL94 5VB, inventive Examples 3 and 4 verified the influence of impact modifier methyl methacrylate-butadiene-styrene on the flame retardance property of the polycarbonate composition under the condition of reducing the amount of the anti-dripping agent. As shown in Table 2, in inventive Examples 3 and 4, the amount of the anti-dripping agent (PTFE) reduced from 0.8 wt. % to 0.3 wt. %, with the weight percent based on the weight of the polycarbonate composition as 100%. The resulting polycarbonate composition could still reach the requirement of the flame-retardant level UL94 5VB (test conditions: 1.5 mm, 2 days, 23° C.), and the notched impact strength could reach 60 kJ/m² (test conditions: −20° C., 3 mm, 5.5 J). The low-temperature impact-resistant property was improved.

In inventive Examples 5 and 6, M2600 polycarbonate component having a higher molecular weight was replaced with M2400 which has a lower molecular weight. Moreover, in inventive Example 6, the content of the polysiloxane-polycarbonate copolymer was reduced to 30 wt. % relative to inventive Examples 1-5, with the weight percent based on the weight of the polycarbonate composition as 100%, and the polycarbonate composition could still reach the requirement of the flame-retardant level UL94 5VB (test conditions: 1.5 mm, 2 days, 23° C.), and the notched impact strength could still reach 54-56 kJ/m² (test conditions: −20° C., 3 mm, 5.5 J). The low-temperature impact-resistant property was improved.

Compared with comparative Example 7 which used the phosphate flame retardant AKD STAB FP-800, inventive Example 1 shows that flame retardant phosphazene under a synergy with the polysiloxane-polycarbonate copolymer and the impact modifier methyl methacrylate-butadiene-styrene could enable the polycarbonate composition reach the requirement of flame-retardant level UL94 5VB (test conditions: 1.5 mm, 2 days, 23° C. and 2.0 mm, 2 days, 23° C.).

TABLE 1

Comparative Examples 1-7

| | | | Comparative Examples | | | | | | |
|---|---|---|---|---|---|---|---|---|---|
| | | | 1 | 2 | 3 | 4 | 5 | 6 | 7 |
| M.2800 | | | | | | 95.3 | 94.3 | | |
| M.2600 | | | 96.3 | 95.3 | 94.3 | | | 56.3 | 56.3 |
| M.2400 | | | | | | | | | |
| polysiloxane-polycarbonate copolymer ST6-3022PJ(1) | | | | | | | | 40 | 40 |
| FS200 (PTFE MB) | | | 0.8 | 0.8 | 0.8 | 0.8 | 0.8 | 0.8 | 0.8 |
| phosphazene FP-110 | | | 2.5 | 3.5 | 4.5 | 2.5 | 2.5 | 2.5 | |
| AKD STAB FP-800 | | | | | | | | | 2.5 |
| Kane ACE M732 | | | | | | 1 | 2 | | 1 |

| Properties | Test Conditions | Units | Test Standards | | | | | | | |
|---|---|---|---|---|---|---|---|---|---|---|
| melt volume flow rate MVR | 300° C., 1.2 kg | cm³/10 min | ISO 1133-1: 2011 | 10.40 | 11.90 | 12.20 | 9.73 | 8.78 | 8.05 | 7.20 |
| Izod notched impact strength | −20° C., 3 mm, 5.5 J | kJ/m² | according to ISO 180/A: 2000 | 8.1C | 8.6C | 9.0C | 12C | 16C | 58 | 61 |
| | −30° C., 3 mm, 5.5 J | kJ/m² | | 9.3C | 8.7C | 8.8C | 11C | 15C | 29 | 56 |
| | −40° C., 3 mm, 5.5 J | kJ/m² | | 9.1C | 8.6C | 8.7C | 9.9C | 12C | 19 | 24 |
| thermal property | | | | | | | | | | |
| Vicat softening temperature | 50N; 120K/h | ° C. | ISO 306: 2013 | 138 | 135 | 134 | 138 | 138 | 138 | 135 |
| flame retardance property UL94 | 1.5 mm 2 days | Class | UL94: 2006 | V0 | V0 | V0 | V0 | V0 | V0 | V0 |
| | 1.0 mm 2 days | Class | UL94: 2006 | V1 | V1 | V0 | V1 | V2 | V0 | V0 |
| flame retardance property UL94 5VB | 2.0 mm 2 days | Class | UL94: 2006 | not pass | not pass | not pass | pass | pass | not pass | not pass |
| flame retardance property UL94 5VB | 1.5 mm 2 days | Class | UL94: 2007 | | | | pass | pass | | |

TABLE 2

Inventive Examples 1-6

| | | | | inventive Examples | | | | | |
|---|---|---|---|---|---|---|---|---|---|
| | | | | 1 | 2 | 3 | 4 | 5 | 6 |
| M.2600 | | | | 55.3 | 54.3 | 55.6 | 55.8 | | |
| M.2400 | | | | | | | | 55.6 | 64.6 |
| polysiloxane-polycarbonate copolymer ST6-3022PJ(1) | | | | 40 | 40 | 40 | 40 | 40 | 30 |
| FS200 (PTFE MB) | | | | 0.8 | 0.8 | 0.5 | 0.3 | 0.5 | 0.5 |
| phosphazene FP-110 | | | | 2.5 | 2.5 | 2.5 | 2.5 | 2.5 | 2.5 |
| Kane ACE M732 | | | | 1 | 2 | 1 | 1 | 1 | 2 |
| Properties | Test Conditions | Units | Standards | | | | | | |
| melt volume flow rate MVR | 300° C., 1.2 kg | cm³/10 min | ISO 1133-1: 2011 | 7.05 | 6.98 | 7.68 | 7.94 | 9.42 | 10.4 |
| Izod notched impact strength | −20° C., 3 mm, 5.5 J | kJ/m² | according to ISO 180/A: 2000 | 59 | 61 | 60 | 60 | 54 | 56 |
| | −30° C., 3 mm, 5.5 J | kJ/m² | | 59 | 56 | 58 | 59 | 50 | 51 |
| | −40° C., 3 mm, 5.5 J | kJ/m² | | 51 | 54 | 54 | 53 | 36 | 41 |
| thermal property | | | | | | | | | |
| Vicat softening temperature | 50N; 120K/h | ° C. | ISO 306: 2013 | 136 | 136 | 138 | 137 | 137 | 137 |
| flame retardance property UL94 | 1.5 mm 2 days | Class | UL94: 2006 | V0 | V0 | V0 | V0 | V0 | V0 |
| | 1.0 mm 2 days | Class | UL94: 2006 | V0 | V0 | V0 | V0 | V0 | V1 |
| flame retardance property UL94 5VB | 2.0 mm 2 days | Class | UL94: 2006 | pass | pass | pass | pass | pass | pass |
| flame retardance property UL94 5VB | 1.5 mm 2 days | Class | UL94: 2007 | pass | pass | pass | pass | pass | pass |

As shown in inventive Examples 1-6 in Table 2, the polycarbonate compositions comprising a polycarbonate component, a polysiloxane-polycarbonate copolymer, phosphazene and methyl methacrylate-butadiene-styrene exhibit good impact resistance property, flame retardance and thermal resistance simultaneously.

Table 3 lists comparative Examples 8-11 of the invention. In comparative Examples 8-11, impact modifiers other than methyl methacrylate-butadiene-styrene were used in the polycarbonate composition, while methyl methacrylate-butadiene-styrenes, such as acrylic rubber-based impact modifiers, Paraloid EXL2300, Paraloid EXL2311, Paraloid EXL2313, were not used. The results of comparative Examples 8-11 show that far from making the polycarbonate compositions reach the requirement of flame-retardant level UL94 5VB (test conditions: 2.0 mm, 2 days, 23° C.), they reduced the flame retardance property of the polycarbonate compositions from UL94 V0 (test conditions: 1.0 mm, 2 days, 23° C.) in inventive Examples 1 and 2 to UL94 V1 (test conditions: 1.0 mm, 2 days, 23° C.) in comparative Examples 8-11, and the decrease of low-temperature impact-resistant property was also observed.

Table 4 lists inventive Examples 7-18 according to the present invention. As shown in Table 4, in inventive Examples 7-18, phosphazene was in an amount of 1.5 wt. % to 5 wt. %; methyl methacrylate-butadiene-styrene was in an amount of 1 wt. % to 5 wt. %; polysiloxane-polycarbonate copolymer was in an amount of 40 wt. % to 80 wt. %; with the weight percent based on the polycarbonate composition as 100 wt. %. Inventive Examples 1-18 show that synergy among polycarbonate, polysiloxane-polycarbonate copolymer, phosphazene and methyl methacrylate-butadiene-styrene enables the polycarbonate composition to realize a good low-temperature impact-resistant property within a broad scope of amount selections, e.g., reaching a low-temperature impact strength at −40° C., good flame retardance, e.g., reaching UL94 5VB (test conditions: 1.5 mm, 2 days, 23° C.) and UL94 5V0 (test conditions: 1.0 mm, 2 days, 23° C., as well as good thermal resistance, e.g., the Vicat softening temperature can be greater than 127° C.

Inventive Examples show that in the present invention, the inventive combination of a polycarbonate component, a polysiloxane-polycarbonate copolymer, methyl methacrylate-butadiene-styrene, and phosphazene compound realizes synergistically the high flame retardance and the strong impact-resistant property of the polycarbonate composition.

TABLE 3

Comparative Examples 8-13

| | Comparative Examples | | | |
|---|---|---|---|---|
| | 8 | 9 | 10 | 11 |
| polycarbonate M.2600 000000 | 55.3 | 54.3 | 55.3 | 55.3 |
| polysiloxane-polycarbonate copolymer ST6-3022PJ(1) | 40 | 40 | 40 | 40 |
| anti-dripping agent FS200 (PTFE MB) | 0.8 | 0.8 | 0.8 | 0.8 |
| phosphazene FP-110 | 2.5 | 2.5 | 2.5 | 2.5 |
| impact modifier Kane ACE M732 | | | | |

TABLE 3-continued

| Comparative Examples 8-13 | | | | | | | | |
|---|---|---|---|---|---|---|---|---|
| impact modifier Paraloid EXL2300 | | | | 1 | 2 | | |
| impact modifier Paraloid EXL2311 | | | | | | 1 | |
| impact modifier Paraloid EXL2313 | | | | | | | 1 |
| Properties | Test Conditions | Units | Standards | | | | |
| melt volume flow rate MVR | 300° C., 1.2 kg | cm³/10 min | ISO 1133-1: 2011 | 7.2 | 6.9 | 7.7 | 7.3 |
| Izod notched impact strength | −20° C., 3 mm, 5.5 J | kJ/m² | according to ISO 180/A: 2000 | 62 | 60 | 60 | 63 |
| | −30° C., 3 mm, 5.5 J | kJ/m² | | 55 | 57 | 56 | 56 |
| | −40° C., 3 mm, 5.5 J | kJ/m² | | 31 | 53 | 29 | 28 |
| Vicat softening temperature | 50N; 120K/h | ° C. | ISO 306: 2013 | 137 | 137 | 138 | 137 |
| flame retardance property UL94 | 1.5 mm 2 days | Class | UL94: 2006 | V0 | V1 | V0 | V0 |
| | 1.0 mm 2 days | Class | UL94: 2006 | V1 | V1 | V1 | V1 |
| flame retardance property UL94 5VB | 2.0 mm 2 days | Class | UL94: 2006 | not pass | not pass | not pass | not pass |
| flame retardance property UL94 5VB | 1.5 mm 2 days | Class | UL94: 2007 | | | | |

TABLE 4

| | | | | Inventive Examples 7-18 | | | | | | | | | | | |
|---|---|---|---|---|---|---|---|---|---|---|---|---|---|---|---|
| | | | | Inventive Examples | | | | | | | | | | | |
| serial No. of the Examples | | | | 7 | 8 | 9 | 10 | 11 | 12 | 13 | 14 | 15 | 16 | 17 | 18 |
| polycarbonate M.2600 | | | | 35 | 15 | 14 | 53 | 51 | 33 | 13 | 11 | 56 | 53 | 51 | 49 |
| polysiloxane-polycarbonate copolymer ST6-3022PJ(1) | | | | 60 | 80 | 80 | 40 | 40 | 60 | 80 | 80 | 40 | 40 | 40 | 40 |
| anti-dripping agent FS200 (PTFE MB) | | | | 0.8 | 0.8 | 0.8 | 0.8 | 0.8 | 0.8 | 0.8 | 0.8 | 0.8 | 0.8 | 0.8 | 0.8 |
| phosphazene FP-110 | | | | 2.5 | 2.5 | 2.5 | 2.5 | 2.5 | 2.5 | 2.5 | 2.5 | 1.5 | 3.5 | 4.5 | 5 |
| MBS impact modifier Kane ACE M732 | | | | 1 | 1 | 2 | 3.5 | 5 | 3.5 | 3.5 | 5 | 1 | 2 | 3 | 5 |
| Properties | Test Conditions | Units | Standards | | | | | | | | | | | | |
| melt volume flow rate MVR | 300° C., 1.2 kg | cm³/10 min | ISO 1133-1: 2011 | 7.73 | 5.5 | 4.9 | 6.7 | 6.0 | 5.5 | 4.2 | 3.5 | 8.7 | 9.2 | 8.9 | 7.9 |
| Izod notched impact strength | −20° C., 3 mm, 5.5 J | kJ/m² | according to ISO 180/A: 2000 | 56P | 55P | 57P | 57P | 55P | 56P | 53P | 51P | 63P | 56P | 55P | 53P |
| | −30° C., 3 mm, 5.5 J | kJ/m² | | 54P | 54P | 54P | 55P | 52P | 53P | 51P | 49P | 57P | 53P | 53P | 53P |
| | −40° C., 3 mm, 5.5 J | kJ/m² | | 50P | 51P | 50P | 50P | 49P | 52P | 50P | 48P | 49P | 48P | 48P | 51P |
| Vicat softening temperature | 50N; 120K/h | ° C. | ISO 306: 2013 | 136 | 135 | 133 | 135 | 135 | 134 | 132 | 132 | 138 | 133 | 130 | 127 |
| flame retardance property UL94 | 1.5 mm 2 days | Class | UL94: 2006 | V0 | V0 | V0 | V0 | V0 | V0 | V0 | V0 | V0 | V0 | V0 | V0 |
| | 1.0 mm 2 days | Class | UL94: 2006 | V0 | V0 | V0 | V0 | V0 | V0 | V0 | V0 | V0 | V0 | V0 | V0 |
| flame retardance property UL94 5VB | 2.0 mm 2 days | Class | UL94: 2006 | pass | pass | pass | pass | pass | pass | pass | pass | pass | pass | pass | pass |
| flame retardance property UL94 5VB | 1.5 mm 2 days | Class | UL94: 2007 | pass | pass | pass | pass | pass | pass | pass | pass | pass | pass | pass | pass |

TABLE 5

| Comparative examples 12 to 14 and inventive example 19 | | | | |
|---|---|---|---|---|
| | comparative | | | inventive |
| | 19 | 20 | 21 | 22 |
| M.2600 | 90.3 | 85.3 | 75.3 | 65.3 |
| Polysiloxane-polycarbonate copolymer ST6-3022PJ(1) | 5 | 10 | 20 | 30 |
| FS200 (PTFE MB) | 0.8 | 0.8 | 0.8 | 0.8 |

TABLE 5-continued

Comparative examples 12 to 14 and inventive example 19

| | | | | | | | |
|---|---|---|---|---|---|---|---|
| Phosphazene FP-110 | | | | 2.5 | 2.5 | 2.5 | 2.5 |
| Kane ACE M732 | | | | 1 | 1 | 1 | 1 |
| Properties | Test conditions | Units | Standards | | | | |
| MVR | 300° C., 1.2 kg | cm³/10 min | ISO 1133-1: 2011 | 10.9 | 10.0 | 8.8 | 8.1 |
| Izod notched impact strength | −20° C., 3 mm. 5.5 J | kJ/m² | Based on ISO | 14C | 19C | 59P | 64P |
| | −30° C., 3 mm. 5.5 J | kJ/m² | 180/A: 2000 | 12C | 16C | 40P | 57P |
| | −40° C., 3 mm. 5.5 J | kJ/m² | | 10C | 11C | 15C | 21C |
| Vicat softening temperature | 50N; 120K/h | ° C. | ISO 306: 2013 | 139 | 139 | 138 | 138 |
| Burning behaviour UL94 | 1.5 mm 2 days | Class | UL94: 2006 | V0 | V0 | V0 | V0 |
| | 1.0 mm 2 days | Class | UL94: 2006 | V0 | V1 | V1 | V0 |
| Burning behaviour UL94 5VB | 2.0 mm 2 days | Class | UL94: 2006 | Pass | Pass | Pass | Pass |
| Burning behaviour UL94 5VB | 1.5 mm 2 days | Class | UL94: 2007 | Pass | Pass | Pass | Pass |

As can be seen from table 5, the compositions of the present invention provide an excellent property profile in that flame retardancy and mechanical properties are optimized when an amount of at least 25 wt.-% of the polysiloxane-polycarbonate copolymer is used.

Although the above text explains the present invention in detail with respect to the object of the present invention, it should be understood that such detailed explanation is only exemplary, apart from the contents that can be defined by the claims, persons skilled in the art can make various changes under the condition of not deviating from the spirit and the scope of the present invention.

The invention claimed is:

1. A polycarbonate composition, comprising
   A) 8-70 wt. % of a polycarbonate component,
   B) 40-90 wt. % of a polysiloxane-polycarbonate copolymer component,
      wherein the siloxane blocks of the polysiloxane-polycarbonate copolymer are derived from the corresponding dihydroxy polysiloxane (I):

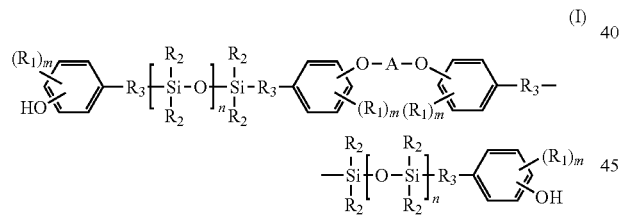

wherein, in this formula (I),
   $R_1$ independently represents hydrogen atom, halogen atom, hydroxy group, alkyl group having 1 to 20 carbon atoms, alkoxy or aryl group;
   $R_2$ independently represents hydrocarbon group having 1 to 13 carbon atoms or hydroxy group;
   $R_3$ independently represents alkylene group having 2 to 8 carbon atoms;
   m independently represents an integer of 0 to 4;
   n independently represents an integer of 1 to 200;
   A represents a structure of the following chemical formula (II):

X represents polynuclear arylene group which has 6 to 30 carbon atoms and is unsubstituted or substituted with halogen atom, alkyl group, alkoxy group, aryl group or carboxy group,
   C) a flame retardant component, which comprises 0.5-6 wt. % of a cyclic phosphazene of formula (X)

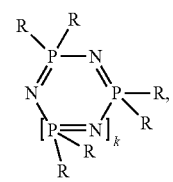

wherein,
   k represents 1 or an integer from 1 to 10,
   having a trimer content (k=1) of from 60 to 98 mol %, based on component C,
   and wherein,
   R is in each case identical or different and represents an amine group; $C_1$- to $C_8$-alkyl, each optionally halogenated; $C_1$- to $C_8$-alkoxy; $C_5$- to $C_6$-cycloalkyl, each optionally substituted by alkyl, and/or by halogen; $C_6$- to $C_{20}$-aryloxy, each optionally substituted by alkyl, and/or by halogen, and/or by hydroxy; $C_7$- to $C_{12}$-aralkyl, each optionally substituted by alkyl, and/or by halogen; or a halogen group; or an OH group, and
   D) an impact modifier component, which comprises 0.5-6 wt. % of methyl methacrylate-butadiene-styrene,
   with the above weight percentages based on said polycarbonate composition as 100 wt. %.

2. The polycarbonate composition according to claim 1, wherein, said polysiloxane-polycarbonate copolymer comprises 4-10 wt. % of siloxane units, based on said polysiloxane-polycarbonate copolymer as 100 wt. %.

3. The polycarbonate composition according to claim 1, wherein, the content of said trimer (k=1) is 65 to 95 mol % based on component C.

4. The polycarbonate composition according to claim 3, wherein, the content of said trimer (k=1) is 65-85 mol %, the content of said tetramers (k=2) is from 10 to 20 mol %, the content of the higher oligophosphazenes (k=3, 4, 5, 6 and 7) is from 5 to 15 mol %, and the content of the phosphazene-oligomers with k≥8 is from 0 to 1 mol %, each based on component C.

5. The polycarbonate composition according to claim 1, wherein, said cyclic phosphazene is one or more selected from the group consisting of propoxyphosphazene, phenoxyphosphazene, methylphenoxyphosphazene, aminophosphazene and fluoroalkylphosphazene.

6. The polycarbonate composition according to claim 1, wherein, said methyl methacrylate-butadiene-styrene has butadiene or butadiene-styrene copolymer as the rubber phase, of which the weight percent is 60-85 wt. %, based on said methyl methacrylate-butadiene-styrene as 100 wt. %.

7. The polycarbonate composition according to claim 1, wherein, said methyl methacrylate-butadiene-styrene has PMMA or PMMA-styrene copolymer as the graft layer.

8. The polycarbonate composition according to claim 1, further comprising a component E) 0.05-1 wt. % of an anti-dripping agent, based on said polycarbonate composition as 100 wt. %.

9. The polycarbonate composition according to claim 1, further comprising lubricants, demolding agents, nucleating agents, stabilizers, antistatic agents, dyes, pigments, fillers, or reinforcing agents.

10. A method comprising utilizing the polycarbonate composition according to claim 1 in the preparation of injection- or thermo-formed molded articles.

11. Molded articles, prepared from the polycarbonate composition according to claim 1.

12. A process for the preparation of a polycarbonate composition, comprising the following steps:
mixing components for the preparation of said polycarbonate composition, said components including:
A) 8-70 wt. % of a polycarbonate component,
B) 40-90 wt. % of a polysiloxane-polycarbonate copolymer component,
wherein the siloxane blocks of the polysiloxane-polycarbonate copolymer are derived from the corresponding dihydroxy polysiloxane (I):

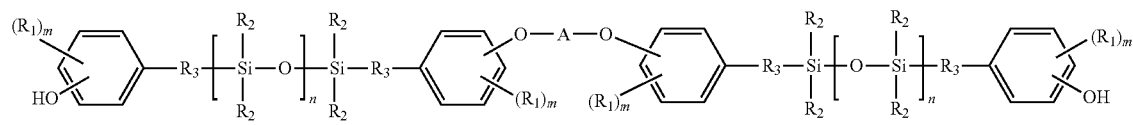

wherein, in this formula (I),
R1 independently represents hydrogen atom, halogen atom, hydroxy group, alkyl group having 1 to 20 carbon atoms, alkoxy or aryl group;
R2 independently represents hydrocarbon group having 1 to 13 carbon atoms or hydroxy group;
R3 independently represents alkylene group having 2 to 8 carbon atoms;
m independently represents an integer of 0 to 4;
n independently represents an integer of 1 to 200;
A represents a structure of the following chemical formula (II):

X represents polynuclear arylene group which has 6 to 30 carbon atoms and is unsubstituted or substituted with halogen atom, alkyl group, alkoxy group, aryl group or carboxy group, C) a flame retardant component, which comprises 0.5-6 wt. % of a cyclic phosphazene of formula (X)

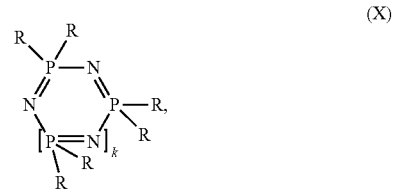

wherein,
k represents 1 or an integer from 1 to 10,
having a trimer content (k=1) of from 60 to 98 mol %, based on component C, and wherein
R is in each case identical or different and represents an amine group; $C_1$- to $C_8$-alkyl, each optionally halogenated; $C_1$- to $C_8$-alkoxy; $C_5$- to $C_6$-cycloalkyl, each optionally substituted by alkyl, and/or by halogen; $C_6$- to $C_{20}$-aryloxy, each optionally substituted by alkyl, and/or by halogen, and/or by hydroxy; $C_7$- to $C_{12}$-aralkyl, each optionally substituted by alkyl, and/or by halogen; or a halogen group; or an OH group, and D) an impact modifier component, which comprises 0.5-6 wt. % of methyl methacrylate-butadiene-styrene,
with the above weight percentages based on said polycarbonate composition as 100 wt. %.

13. A polycarbonate composition, consisting of:
A) 8-70 wt. % of a polycarbonate component,
B) 25-90 wt. % of a polysiloxane-polycarbonate copolymer component,
C) a flame retardant component, which comprises 0.5-6 wt. % of a cyclic phosphazene of formula (X)

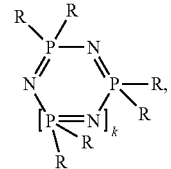

wherein,
k represents 1 or an integer from 1 to 10,
having a trimer content (k=1) of from 60 to 98 mol %, based on component C,
and wherein,
R is in each case identical or different and represents an amine group; $C_1$- to $C_8$-alkyl, each optionally halogenated; $C_1$- to $C_8$-alkoxy; $C_5$- to $C_6$-cycloalkyl, each optionally substituted by alkyl, and/or by halogen; $C_6$- to $C_{20}$-aryloxy, each optionally substituted by alkyl, and/or by halogen, and/or by hydroxy; $C_7$- to $C_{12}$-aralkyl, each optionally substituted by alkyl, and/or by halogen; or a halogen group; or an OH group, and D) an impact modifier component, which comprises 0.5-6 wt. % of methyl methacrylate-butadiene-styrene, optionally, E) 0.05-1 wt. % of an anti-dripping agent, based on said polycarbonate composition as 100 wt. %, and optionally lubricants, demolding agents, nucleating agents, stabilizers, antistatic agents, dyes, pigments, fillers and reinforcing agents, with the above weight percentages based on said polycarbonate composition as 100 wt. %.

14. The polycarbonate composition according to claim 13, wherein the siloxane blocks of the polysiloxane-polycarbonate copolymer are derived from the corresponding dihydroxy polysiloxane (I):

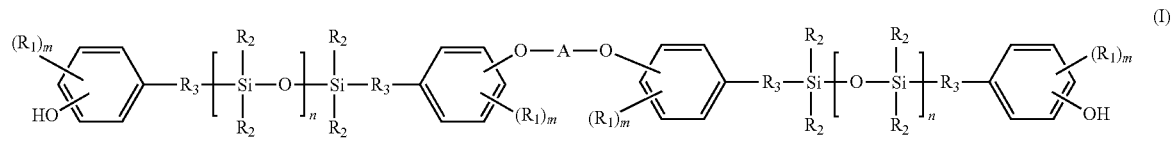

wherein, in this formula (I),

R1 independently represents hydrogen atom, halogen atom, hydroxy group, alkyl group having 1 to 20 carbon atoms, alkoxy or aryl group;

R2 independently represents hydrocarbon group having 1 to 13 carbon atoms or hydroxy group;

R3 independently represents alkylene group having 2 to 8 carbon atoms;

m independently represents an integer of 0 to 4;

n independently represents an integer of 1 to 200;

A represents a structure of the following chemical formula (II):

X represents polynuclear arylene group which has 6 to 30 carbon atoms and is unsubstituted or substituted with halogen atom, alkyl group, alkoxy group, aryl group or carboxy group.

15. A method comprising utilizing the polycarbonate composition according to claim 13 in the preparation of injection- or thermo-formed molded articles.

16. Molded articles, prepared from the polycarbonate composition according to claim 13.

17. A process for the preparation of a polycarbonate composition, comprising the following steps:

mixing components for the preparation of said polycarbonate composition, said components consisting of:

A) 8-70 wt. % of a polycarbonate component,

B) 25-90 wt. % of a polysiloxane-polycarbonate copolymer component,

C) a flame retardant component, which comprises 0.5-6 wt. % of a cyclic phosphazene of formula (X)

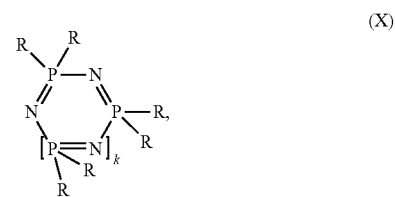

wherein, k represents 1 or an integer from 1 to 10, having a trimer content (k=1) of from 60 to 98 mol %, based on component C, and wherein, R is in each case identical or different and represents an amine group; $C_1$- to $C_8$-alkyl, each optionally halogenated; $C_1$- to $C_8$-alkoxy; $C_5$- to $C_6$-cycloalkyl, each optionally substituted by alkyl, and/or by halogen; $C_6$- to $C_{20}$-aryloxy, each optionally substituted by alkyl, and/or by halogen, and/or by hydroxy; $C_7$- to $C_{12}$-aralkyl, each optionally substituted by alkyl, and/or by halogen; or a halogen group; or an OH group, and D) an impact modifier component, which comprises 0.5-6 wt. % of methyl methacrylate-butadiene-styrene, optionally, E) 0.05-1 wt. % of an anti-dripping agent, based on said polycarbonate composition as 100 wt. %, and optionally lubricants, demolding agents, nucleating agents, stabilizers, antistatic agents, dyes, pigments, fillers and reinforcing agents, with the above weight percentages based on said polycarbonate composition as 100 wt. %.

* * * * *